Dec. 11, 1923.
E. A. STACK
VALVE LATHE
Filed March 3, 1922
1,477,194
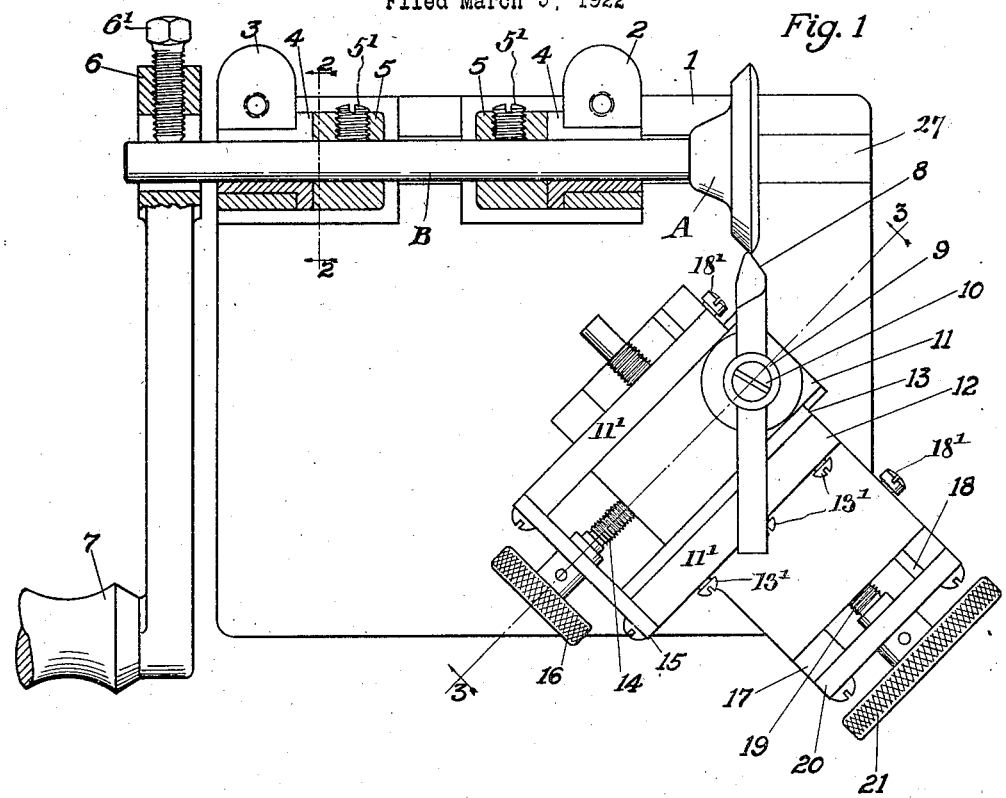
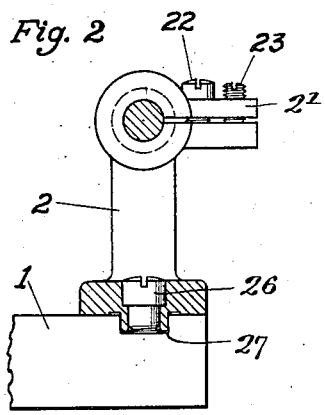
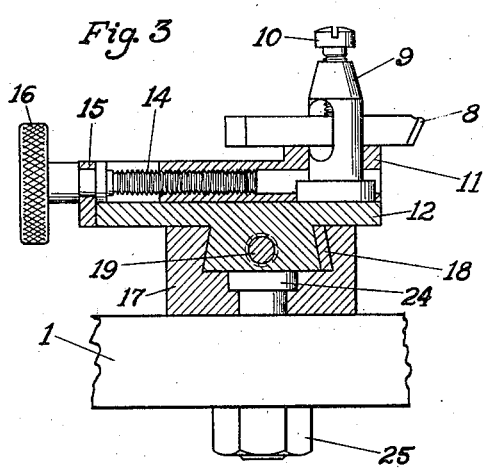
Inventor
EDWARD A. STACK,
By his Attorneys,
Baldwin Wight Patented Dec. 11, 1923.

1,477,194

UNITED STATES PATENT OFFICE.

EDWARD A. STACK, OF BRISTOL, CONNECTICUT.

VALVE LATHE.

Application filed March 3, 1922. Serial No. 540,752.

*To all whom it may concern:*

Be it known that I, EDWARD A. STACK, a citizen of the United States, and resident of Bristol, in the county of Hartford and State of Connecticut, have invented certain new and useful Improvements in Valve Lathes, of which the following is a full, clear, and exact description.

An object of my invention is to provide a device for re-facing or redressing valves which will be simple in construction and efficient in operation.

Another object is to provide such a device that can be set with great accuracy to enable the treatment of valves of different sizes and having faces of different angles.

Other objects will be apparent from the following detailed description and the appended claims.

In the drawings:

Figure 1 is a top plan view, partly in section, of my invention.

Figure 2 is a section on the line 2—2 of Figure 1.

Figure 3 is a section on the line 3—3 of Figure 1.

A base 1 supports standards 2 and 3 which terminate at the top in split casings 2' in which fit similarly split bushings 4. Through these bushings passes the stem B of a valve A. The split casings and bushings may be drawn together as required by screws 22 and held by stop screws 23. This provides means whereby valve stems of different sizes may be accommodated. Collars 5 are adapted to be clamped to the valve stem by screws 5', and they are so located with reference to the bushings 4 that the movement of the valve stem in either direction is positively prevented while the rotary movement thereof is freely permitted. The hub 6 of a crank 7 is adapted to be clamped to the valve stem by a set screw 6', so that the valve stem may be rotated by the crank.

A cutting tool 8 of any desired type is held in an opening in a standard 9 by means of a set screw 10. The standard 9 is carried by a block 11 that slides between guides 11' of a block 12. The side of one guideway is formed by an adjustable strip 13 positioned by screws 13'. This provides for taking up any wear of the block or the guideways and also affords means for truing the guide passage. At one side the guides 11' and strip 13 project beyond the block 12 and are joined by a cross piece 15. A screw 14 that has threaded engagement with the block 11 is mounted to rotate freely in the cross strip 15 and has a milled finger piece 16.

The block 12 is mounted to slide in a dovetailed groove in a support 17 carried by the base plate 1. One side of this groove is provided with a strip 18 adjustable by screws 18' and having the same function as the strip 13, above described. A connecting end piece 20 has mounted to rotate freely therein a screw 19 which has screw threaded engagement with the block 12 and is provided with a milled finger piece 21. The block 17 is fastened to the base plate by a bolt 24 having a nut 25 on its outer end.

The standards 2 and 3 slide in a groove 27 in the base plate, and may be held in different positions by screws 26.

The operation of the device will be obvious from the above description but may be briefly stated as follows. The valve stem is passed into position through the bushings 4 and collars 5. Each collar is pressed firmly against the adjacent bushing and fastened by the set screw 5'. The bushings are drawn together by the screws 22 and held by the screws 23 so that the valve stem may rotate therein but is prevented from any wabbling or lost motion, while the collars 5 prevent endwise movement in either direction. The cutting tool is given substantially correct adjustment in its support 9 and clamped by the screw 10. Fine adjustments in two directions at right angles to each other can be obtained by the finger pieces 16 and 21 so that the tool 8 may be set at exactly the right angle and desired position. The right hand side of the base or other parts may be provided with scales as desired to determine correct adjustment and the angle of the valve. The handle 7 is thereupon clamped upon the valve stem, and by the rotation of the stem the valve may be refaced or redressed. The position of the block 17 may be changed by loosening nut 25 and making desired adjustment.

It is obvious that detailed changes in form and proportions may be made without departing from the spirit of my invention. Cutting tools of different types may be employed. A small pulley may be substituted for one of the collars 5 and power employed to turn the valve stem. In general it is to be understood that the invention is limited only by the scope of the appended claims.

I claim as my invention:

1. A valve lathe comprising a base member, standards thereon supporting split bushings in which a valve stem is adapted to fit, means for holding said valve stem against endwise movement, a support carried by said base, a block slidably carried by the support, a second block slidably carried by the first block, and a cutting tool adjustably carried by the second block.

2. A valve lathe comprising a base member, standards thereon supporting split bushings in which a valve stem is adapted to fit, means for holding the valve stem against endwise movement in said bushings, a support pivotally mounted on said base, a block slidably carried by the support, a second block slidably carried by the first block, a cutting tool adjustably carried by the second block, and means for rotating the valve stem.

3. A valve lathe comprising a base member, standards thereon supporting split bushings in which a valve stem is adapted to fit, means for varying the size of the bushings, means for holding the valve against endwise motion in said bushings, a support pivotally mounted on the base, a cutting tool mounted on said support, means for adjusting the cutting tool in one direction, and independent manual means for adjusting the cutting tool in another direction at right angles thereto, said adjusting means also acting to hold the tool in any desired adjusting position.

In testimony whereof, I have hereunto subscribed my name.

EDWARD A. STACK.